(12) United States Patent
Niu et al.

(10) Patent No.: US 12,126,396 B2
(45) Date of Patent: Oct. 22, 2024

(54) DOMAIN DECOMPOSITION METHOD AND SYSTEM FOR ELECTROMAGNETIC SIMULATION

(71) Applicants: Anhui University, Hefei (CN); Anhui Coreach Technology Co.,Ltd., Hefei (CN)

(72) Inventors: Kaikun Niu, Hefei (CN); Jirui Zhang, Hefei (CN); Ping Li, Hefei (CN); Xingang Ren, Hefei (CN); Guoda Xie, Hefei (CN); Zhixiang Huang, Hefei (CN); Lixia Yang, Hefei (CN); You Peng, Hefei (CN); Jianxin Chen, Hefei (CN); Feng Xiao, Hefei (CN)

(73) Assignees: Anhui University, Hefei (CN); Anhui Coreach Technology Co.,Ltd., Hefei (CN)

( * ) Notice: Subject to any disclaimer, the term of this patent is extended or adjusted under 35 U.S.C. 154(b) by 149 days.

(21) Appl. No.: 18/166,720

(22) Filed: Feb. 9, 2023

(65) Prior Publication Data

US 2024/0204892 A1  Jun. 20, 2024

(30) Foreign Application Priority Data

Dec. 20, 2022 (CN) .......................... 202211635892.3

(51) Int. Cl.
*H04B 17/391* (2015.01)
*H04B 17/19* (2015.01)

(52) U.S. Cl.
CPC ......... *H04B 17/3912* (2015.01); *H04B 17/19* (2015.01)

(58) Field of Classification Search
CPC ...... H04B 17/3912; H04B 17/19; Y02E 60/00
See application file for complete search history.

(56) References Cited

U.S. PATENT DOCUMENTS

| 8,510,091 B1 * | 8/2013 | Zhao | G06F 30/23 343/893 |
| 8,868,382 B2 * | 10/2014 | Schoeberl | G06F 30/23 703/2 |
| 2024/0080113 A1 * | 3/2024 | Park | H04W 24/10 |

* cited by examiner

*Primary Examiner* — Seung H Lee
(74) *Attorney, Agent, or Firm* — Venable LLP

(57) ABSTRACT

The present disclosure relates to a domain decomposition method and system for electromagnetic simulation. The method includes: dividing an antenna structure model into multiple subdomains, where each of the subdomains corresponds to a structure in one to-be-simulated array antenna; subdividing each of the subdomains by a tetrahedral network to obtain multiple tetrahedrons; obtaining a vector basis function of each edge of each of the tetrahedrons according to vertex positions and lengths of the edges of the tetrahedron; and calculating an electric field value and a magnetic field value of any point in a tetrahedron to which each of the edges belongs using a vector basis function corresponding to the edge and a double curl electric field wave equation of a subdomain to which the edge belongs.

8 Claims, 6 Drawing Sheets

---

Divide an antenna structure model into multiple sub-domains

↓ S1

Subdivide each of the sub-domains by a tetrahedral network to obtain multiple tetrahedrons

↓ S2

Obtain a vector basis function of each edge of each of the tetrahedrons according to vertex positions and lengths of the edges of the tetrahedron

↓ S3

Calculate an electric field value and a magnetic field value of any point in a tetrahedron to which each of the edges belongs using a vector basis function corresponding to the edge and a double curl electric field wave equation of a sub-domain to which the edge belongs

↓ S4

DOMAIN DECOMPOSITION METHOD AND SYSTEM FOR ELECTROMAGNETIC SIMULATION

CROSS REFERENCE TO RELATED APPLICATION

This patent application claims the benefit and priority of Chinese Patent Application No. 202211635892.3, filed with the China National Intellectual Property Administration on Dec. 20, 2022, the disclosure of which is incorporated by reference herein in its entirety as part of the present application.

TECHNICAL FIELD

The present disclosure relates to the field of computational electromagnetic simulation, and in particular, to a domain decomposition method and system for electromagnetic simulation based on discontinuous Galerkin-Robin transmission conditions (DGRTCs).

BACKGROUND

Computational electromagnetics is developed based on the theory of the electromagnetic field. By using the Maxwell equation/wave equation, computational mathematical methods, as well as high-performance computer technology, it aims to solve complex electromagnetic field theory and engineering application problems. The most commonly used method of computational electromagnetics is the full-wave numerical algorithm, which mainly includes the finite element method (FEM) based on the differential equation, the finite-difference time-domain method (FDTD), and the method of moments based on an integral equation. Computational electromagnetic methods are also widely used in antenna design and optimization, electromagnetic compatibility of microwave devices, radar target feature analysis and recognition, and chip simulation and design.

With the rapid development of information technology, Moore's Law continues to approach the limit, complementary metal oxide semiconductor (CMOS) technology continues to progress and develop, and the size of the chip has been reduced to the nanometer level. Based on the traditional through silicon via (TSV) technology and through glass via (TGV) technology, scholars have proposed new technologies such as graphene via and carbon nano via, and the physical size has entered the atomic level. The development of heterogeneous integration technology makes it possible to integrate nano, micro, and even macro devices into a single package. Therefore, the complexity of electromagnetic engineering simulation problems such as array antenna and the integrated circuit is limited by the electrical size, large scale of the integrated circuit and huge size difference (multi-scale). With the improvement of computing scale and model complexity, it is increasingly difficult to ensure the quality of mesh subdivision and the efficient and accurate solution of the system matrix. To "capture" the rapidly changing field information in a small structure, the global fine subdivision of the whole system will greatly affect the mesh quality and matrix state. The unknown quantity will also increase sharply, resulting in the waste of computing resources such as memory and running time. It is difficult for traditional methods to find an excellent balance between computational efficiency and computational accuracy when facing such problems. Therefore, it is urgent to research efficient, stable, and feasible numerical algorithms.

The domain decomposition method is one of the effective solutions to such problems. Its core idea is "divide and conquer", that is, decompose a large problem/space that is difficult to solve into multiple smaller subproblems/subspaces that are easy to solve and solve them separately. The subspaces are connected with appropriate transmission conditions. The new problem to be solved after decomposition is completely equivalent to the original problem, to solve the problem of matrix ill-condition and difficult convergence encountered by the traditional FEM when solving the large-scale matrix.

SUMMARY

An objective of the present disclosure is to provide a domain decomposition method and system for electromagnetic simulation, to achieve efficient and accurate full-wave simulation of the antenna array.

To achieve the above objective, the present disclosure provides the following technical solutions:

A domain decomposition method for electromagnetic simulation includes:
dividing an antenna structure model into multiple subdomains, where the antenna structure model is an antenna structure model obtained by modeling to-be-simulated array antennas with modeling software; and each of the subdomains corresponds to a structure in one of the to-be-simulated array antennas;
subdividing each of the subdomains by a tetrahedral network to obtain multiple tetrahedrons, where the size of the tetrahedral network is determined by a degree of fine demand of the corresponding subdomain, and the degree of fine demand of the subdomain is determined by a degree of fine subdivision demand of a corresponding structure;
obtaining a vector basis function of each edge of each of the tetrahedrons according to vertex positions and lengths of the edges of the tetrahedron, where the vector basis function includes an electric field vector basis function and a magnetic field vector basis function; and
calculating an electric field value and a magnetic field value of any point in a tetrahedron to which each of the edges belongs using a vector basis function corresponding to the edge, expansion coefficients, and a double curl electric field wave equation of a subdomain to which the edge belongs.

Optionally, a process of calculating an electric field value and a magnetic field value of any point in a tetrahedron to which each of the edges belongs using a vector basis function corresponding to the edge and a double curl electric field wave equation of a subdomain to which the edge belongs specifically includes:
performing a discontinuous Galerkin (DG) test on the double curl electric field wave equation of the subdomain to which the edge belongs to obtain a test equation;
substituting a numerical flux into the test equation to obtain a first equation;
defining a boundary condition equation satisfying the tangential continuity of an electric field and a magnetic field of the subdomain, where the tangential continuity means that components of the electric field and the magnetic field in a tangential direction are continuous at an interface of every two adjacent subdomains;
performing a DG test on the boundary condition equation to obtain a second equation;

calculating an electric field expansion coefficient of the edge and a magnetic field expansion coefficient of the edge according to the first equation and the second equation;

calculating the electric field value of any point in the tetrahedron to which the edge belongs according to the electric field expansion coefficient of the edge and the electric field vector basis function corresponding to the edge; and calculating the magnetic field value at the interface of the subdomain to which the edge belongs according to the magnetic field expansion coefficient of the edge and the magnetic field vector basis function corresponding to the edge.

It should be noted that for the magnetic field value here, only the magnetic field value at the interface of the subdomain needs to be calculated (because the magnetic field expansion coefficient and the magnetic field vector basis function only exist at the interface of the subdomain). In fact, when the electric field value is obtained, the magnetic field value in the whole domain can be calculated through the Maxwell equation.

Optionally, the equation of the DG test on the electric field wave equation is:

$$\int_{\Omega_i}\left[(\nabla\times\Phi^i)\cdot(\mu_i^{-1}\nabla\times E^i)-\omega^2\Phi^i\cdot\varepsilon_i E^i+j\omega\Phi^i\cdot\sigma_i E^i\right]dV+$$

$$j\omega\int_{\partial\Omega_i}\Phi^i\cdot(\hat{n}^i\times\tilde{H}^i)dS=-j\omega\int_{\Omega_i}\Phi^i\cdot J_{im}^i dV,$$

where i represents an i-th subdomain, and $\varepsilon_i$, $\mu_i$, and $\sigma_i$ are a permittivity of a subdomain $\Omega_i$, a magnetic permeability of the subdomain $\Omega_i$, and electric conductivity of the subdomain $\Omega_i$ respectively; $\Phi$ is a testing function, and the testing function is equal to an electric field vector basis function; E is the electric field; H is the magnetic field; $\hat{n}$ represents a normal unit vector; j is an imaginary part; ω is an angular frequency; $J_{im}^{i}$ is an impressed volume electric current source in the subdomain $\Omega_i$; ∇× represents a curl symbol; V represents a volume of the subdomain; and S represents a surface area of the subdomain.

Optionally, a formula of the numerical flux is:

$$\hat{n}^i\times\tilde{H}^i=\hat{n}^i\times\left[\frac{(Z^iH^i+Z^jH^j)+\hat{n}^i\times(E^i-E^j)}{Z^i+Z^j}\right],$$

where $Z^i$ represents the wave impedance of the subdomain $\Omega_i$; $Z^j$ represents the wave impedance of a neighboring subdomain $\Omega_j$; the neighboring subdomain is a neighboring subdomain of the subdomain; $H^i$ represents a magnetic field at an interface of the subdomain $\Omega_i$, and $H^j$ represents a magnetic field at an interface of the neighboring subdomain $\Omega_j$; $E^i$ represents an electric field at the interface of the subdomain, and $E^j$ represents an electric field at the interface of the neighboring subdomain; and $\hat{n}$ represents a normal unit vector.

Optionally, the boundary condition equation is:

$$\hat{n}^i\times E^j-\tau\hat{n}^i\times H^i\times\hat{n}^i=-\hat{n}^i\times E^j-\tau\hat{n}^i\times H^j\times\hat{n}^i,$$

where τ is a scale factor.

Optionally, the second equation is:

$$j\omega\int_{\partial\Omega_i}\Psi^i\cdot\left[\hat{n}^i\times(E^i-E^j)-\tau\hat{n}^i\times(H^i-H^j)\times\hat{n}^i\right]dS=0,$$

where $\Psi^i$ is a magnetic field vector basis function of the subdomain $\Omega_i$; j is an imaginary part; and ω is angular frequency.

The present disclosure further provides a domain decomposition system for electromagnetic simulation, including:

a domain division module configured to divide an antenna structure model into multiple subdomains, where the antenna structure model is an antenna structure model obtained by modeling to-be-simulated array antennas with modeling software; and each of the subdomains corresponds to a structure in one of the to-be-simulated array antennas;

a subdivision module configured to subdivide each of the subdomains by a tetrahedral network to obtain multiple tetrahedrons, where the size of the tetrahedral network is determined by a degree of fine demand of the corresponding subdomain, and the degree of fine demand of the subdomain is determined by a degree of fine subdivision demand of a corresponding structure;

a vector basis function obtaining module configured to obtain a vector basis function of each edge of each of the tetrahedrons according to vertex positions, lengths of the edges, and a volume parameter of the tetrahedron, where the vector basis function includes an electric field vector basis function and a magnetic field vector basis function; and an electric field and magnetic field calculation module configured to calculate an electric field value and a magnetic field value of any point in a tetrahedron to which each of the edges belongs using a vector basis function corresponding to the edge, expansion coefficients, and a double curl electric field wave equation of a subdomain to which the edge belongs.

Optionally, the electric field and magnetic field calculation module specifically include:

a first test sub-module configured to perform a DG test on the double curl electric field wave equation of the subdomain to which the edge belongs to obtain a test equation;

a first equation obtaining sub-module configured to substitute a numerical flux into the test equation to obtain a first equation;

a boundary condition equation obtaining a sub-module configured to define a boundary condition equation satisfying the tangential continuity of an electric field and a magnetic field of the subdomain, where the tangential continuity means that components of the electric field and the magnetic field in a tangential direction are continuous at an interface of every two adjacent subdomains;

a second test sub-module configured to perform a DG test on the boundary condition equation to obtain a second equation;

an expansion coefficient calculation sub-module configured to calculate an electric field expansion coefficient of the edge and a magnetic field expansion coefficient of the edge according to the first equation and the second equation;

an electric field value calculation sub-module configured to calculate the electric field value of any point in the tetrahedron to which the edge belongs according to the electric field expansion coefficient of the edge and the electric field vector basis function corresponding to the edge; and a magnetic field value calculation sub-module configured to calculate the magnetic field value of any point in the tetrahedron to which the edge belongs according to the magnetic field expansion coefficient of the edge and the magnetic field vector basis function corresponding to the edge.

According to the specific embodiments provided by the present disclosure, the present disclosure discloses the following technical effects:

The present disclosure provides the domain decomposition method and system for electromagnetic simulation. The method includes: dividing an antenna structure model into multiple subdomains, where each of the subdomains corresponds to a structure in one to-be-simulated array antenna; subdividing each of the subdomains by a tetrahedral network to obtain multiple tetrahedrons; obtaining a vector basis function of each edge of each of the tetrahedrons according to vertex positions and lengths of the edges of the tetrahedron; and calculating an electric field value and a magnetic field value of any point in a tetrahedron to which each of the edges belongs using a vector basis function corresponding to the edge and a double curl electric field wave equation of a subdomain to which the edge belongs. The antenna structure model is divided according to the structure of the array antenna. Each of the divided subdomains corresponds to a structure in one of the to-be-simulated array antennas. Different structures are subdivided using tetrahedral meshes of different sizes. For fine structures, the smaller tetrahedral meshes are used for fine division. For the non-fine structures, slightly larger tetrahedral meshes can be used for division. Therefore, the defect of low calculation accuracy caused by the use of larger tetrahedral meshes to subdivide the entire antenna array in order to reduce the amount of calculation in the prior art is avoided. In addition, because the subdomains with a high degree of fine demand are subdivided by smaller tetrahedral meshes in the present disclosure, the defect of low calculation efficiency caused by the use of finer tetrahedral meshes to subdivide the entire antenna array in order to ensure the calculation accuracy in the prior art is avoided. Thus, the solution of the present disclosure can realize efficient and accurate simulation calculations of the antenna array.

BRIEF DESCRIPTION OF THE DRAWINGS

To describe the technical solutions in the embodiments of the present disclosure or the prior art more clearly, the accompanying drawings required for the embodiments are briefly described below. Apparently, the accompanying drawings in the following description show merely some embodiments of the present disclosure, and those of ordinary skill in the art may still derive other accompanying drawings from these accompanying drawings without creative efforts.

DETAILED DESCRIPTION OF THE EMBODIMENTS

Figure 1:
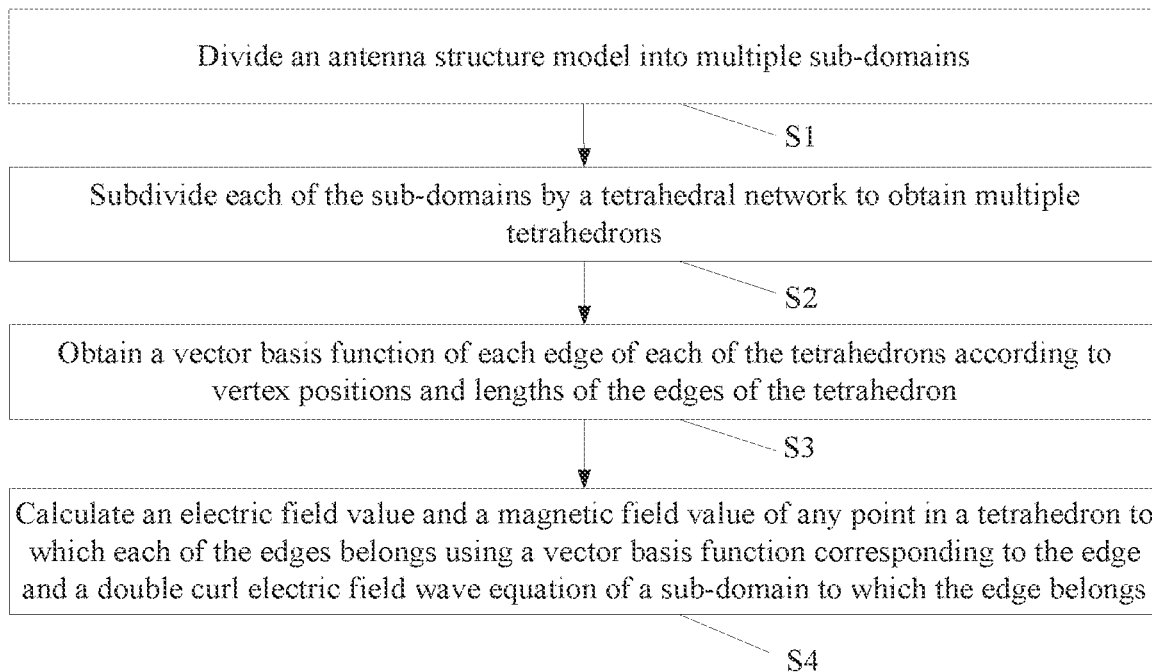
FIG. 1 is a flow chart of a domain decomposition method for electromagnetic simulation provided by Embodiment 1 of the present disclosure.

The technical solutions of the embodiments of the present disclosure are clearly and completely described below regarding the accompanying drawings. Apparently, the described embodiments are merely a part rather than all of the embodiments of the present disclosure. All other embodiments obtained by those of ordinary skill in the art based on the embodiments of the present disclosure without creative efforts shall fall within the protection scope of the present disclosure.

An objective of the present disclosure is to provide a domain decomposition method and system for electromagnetic simulation, to achieve efficient and accurate full wave simulation.

To make the above-mentioned objective, features, and advantages of the present disclosure clearer and more comprehensible, the present disclosure will be further described in detail below in conjunction with the accompanying drawings and specific embodiments.

Embodiment 1

The present embodiment provides a domain decomposition method for electromagnetic simulation, including the following steps.

S1, An antenna structure model is divided into multiple subdomains. The antenna structure model is an antenna structure model obtained by modeling to-be-simulated array antennas with modeling software. Each of the subdomains corresponds to a structure in one of the to-be-simulated array antennas.

S2, Each of the subdomains is subdivided by a tetrahedral network to obtain multiple tetrahedrons. The size of the tetrahedral network is determined by the degree of fine demand of the corresponding subdomain, and the degree of fine demand of the subdomain is determined by the degree of fine subdivision demand of a corresponding structure.

S3, A vector basis function of each edge of each of the tetrahedrons is obtained according to vertex positions and lengths of the edges of the tetrahedron. The vector basis function includes an electric field vector basis function and a magnetic field vector basis function.

S4, An electric field value and a magnetic field value of any point in a tetrahedron to which each of the edges belongs are calculated using a vector basis function corresponding to the edge and a double curl electric field wave equation of a subdomain to which the edge belongs.

Optionally, step S4 specifically includes the following sub-steps.

S41, A DG test is performed on the double curl electric field wave equation of the subdomain to which the edge belongs to obtain a test equation.

First, a double curl E-field wave equation of a subdomain $\Omega_i$ is defined as:

$$\nabla \times (\mu_i^{-1} \nabla \times E^i) - \omega^2 \varepsilon_i E^i + j\omega\sigma_i E^i = -j\omega J_{im}^i \quad (1),$$

where $\varepsilon_i$, $\mu_i$, and $\sigma_i$ are a permittivity of the subdomain $\Omega_i$, magnetic permeability of the subdomain $\Omega_i$, and an electric conductivity of the subdomain $\Omega_i$ respectively, $J_{im}^i$ is an impressed volume electric current source in the subdomain $\Omega_i$, and E is the electric field.

A DG test is performed on (1) with a testing function of the electric field vector basis function of the edge to obtain the test equation:

$$\int_{\Omega_i} \left[ (\nabla \times \Phi^i) \cdot (\mu_i^{-1} \nabla \times E^i) - \omega^2 \Phi^i \cdot \varepsilon_i E^i + j\omega \Phi^i \cdot \sigma_i E^i \right] dV + \quad (2)$$

$$j\omega \int_{\partial\Omega_i} \Phi^i \cdot (\hat{n}^i \times \tilde{H}^i) dS = -j\omega \int_{\Omega_i} \Phi^i \cdot J_{im}^i dV,$$

where i represents an i-th subdomain, $\varepsilon_i$, $\mu_i$, and $\sigma_i$ are a permittivity of a subdomain $\Omega_i$, a magnetic permeability of the subdomain $\Omega_i$, and an electric conductivity of the subdomain $\Omega_i$ respectively, $\Phi$ is a testing function and the testing function is equal to an electric field vector basis function, E is the electric field, H is the magnetic field, $\hat{n}$ represents a normal unit vector, j is an imaginary part, $\omega$ is an angular frequency, $J_{im}^i$ is an impressed volume electric current source in the subdomain $\Omega_i$, $\nabla\times$ represents a curl symbol, V represents a volume of the subdomain, and S represents an area of the subdomain.

S42, A numerical flux is substituted into the test equation to obtain a first equation.

Optionally, a formula of the numerical flux is:

$$\hat{n}^i \times \tilde{H}^i = \hat{n}^i \times \left[ \frac{(Z^i H^i + Z^j H^j) + \hat{n}^i \times (E^i - E^j)}{Z^i + Z^j} \right], \quad (3)$$

where $Z^i$ represents the wave impedance of the subdomain $\Omega_i$, $Z^j$ represents the wave impedance of a neighboring subdomain $\Omega_j$, the neighboring subdomain is a neighboring subdomain of the subdomain, $H^i$ represents a magnetic field at an interface of the subdomain $\Omega_i$, $H^j$ represents a magnetic field at an interface of the neighboring subdomain $\Omega_j$, $E^i$ represents an electric field at the interface of the subdomain, and $E^i$ represents an electric field at the interface of the neighboring subdomain.

The numerical flux has two main functions: (1) implementation of boundary conditions and (2) facilitation of information exchange between adjacent subdomains.

S43, A boundary condition equation satisfying tangential continuity of an electric field and a magnetic field of the subdomain is defined. The tangential continuity means that components of the electric field and the magnetic field in a tangential direction are continuous at an interface of every two adjacent subdomains.

According to the above formula (3), the magnetic field $H^j$ at the interface of adjacent subdomains is introduced, so another equation is required.

In order to ensure that the decomposed problem has the same solution as the original problem, it is necessary to maintain the tangential continuity of E and H at the interface of adjacent subdomains. That is, $$\hat{n}^i \times E^i = -\hat{n}^j \times E^j \quad (4),$$

and $$\hat{n}^i \times H^i \times \hat{n}^i = \hat{n}^j \times H^j \times \hat{n}^j \quad (5).$$

Through (4) and (5), a Robin transmission condition (RTC) can be implemented:

$$\hat{n}^i \times E^i - \tau \hat{n}^i \times H^i \times \hat{n}^i = -\hat{n}^j \times E^j - \tau \hat{n}^j \times H^j \times \hat{n}^j \quad (6),$$

where $\tau$ is a scale factor used to balance the matrix system formed later.

$\hat{n}^j = \hat{n}^i$ is substituted into Formula (6) to obtain:

$$\hat{n}^i \times (E^i - E^j) - \tau \hat{n}^i \times (H^i - H^j) \times \hat{n}^i = 0 \quad (7).$$

S44, A DG test is performed on the boundary condition equation to obtain a second equation.

A DG test is performed on Formula (7) with a testing function of the magnetic field vector basis function of the edge. After the test, the left and right sides are multiplied by $j\omega$:

$$j\omega \int_{\partial\Omega_i} \Psi^i \cdot \left[ \hat{n}^i \times (E^i - E^j) - \tau \hat{n}^i \times (H^i - H^j) \times \hat{n}^i \right] dS = 0, \quad (8)$$

where $\Psi^i$ is a magnetic field vector basis function of the subdomain $\Omega_i$.

S45, An electric field expansion coefficient of the edge and a magnetic field expansion coefficient of the edge are calculated according to the first equation and the second equation.

$E^{i/j}$ and $H^{i/j}$ are expanded by the vector basis functions $\Phi_l^{i/j}$ and $\Psi_l^{i/j}$:

$$E^{i/j} = \sum_{l=1}^{l_e^{i/j}} e_l^{i/j} \Phi_l^{i/j}, \text{ and} \quad (9)$$

$$H^{i/j} = \sum_{l=1}^{l_h^{i/j}} h_l^{i/j} \Psi_l^{i/j}, \quad (10)$$

where $\Phi_l$ represents an l-th electric field vector basis function, $\Psi_l$ represents an l-th magnetic field vector basis function, $e_l$ represents the electric field expansion coefficient corresponding to $\Phi_l$, $h_l$ represents the magnetic field expansion coefficient corresponding to $\Psi_l$, $l_e$ represents a total number of electric field vector basis functions in the subdomain, and $l_h$ represents a total number of magnetic field vector basis functions in the subdomain.

It should be noted that the magnetic field $H^{i/j}$ is only distributed at the interface of subdomains i and j, while the electric field $E^{i/j}$ is distributed at any point of the array antenna, so the unknown quantity of the magnetic field is much smaller than that of the electric field. The traditional DG method solves the Maxwell equation, which needs to solve the electric field and the magnetic field simultaneously in the whole domain. It consumes a lot of memory when dealing with large-scale integrated circuit problems, which is a heavy burden. In order to solve the electric field wave equation, this algorithm only needs to solve the magnetic field at the interface of domain decomposition and the electric field in the whole domain, which greatly reduces the cost of memory.

According to Formulas (2) and (8), Formulas (9) and (10) are used to replace the electric field E and magnetic field H in (2) and (8), and the following matrix equation is obtained:

$$\begin{bmatrix} A^i & 0 \\ 0 & 0 \end{bmatrix}\begin{bmatrix} e^i \\ h^i \end{bmatrix} + \sum_j \begin{bmatrix} F_{ee}^{ij} & F_{eh}^{ij} \\ F_{he}^{ij} & F_{hh}^{ij} \end{bmatrix}\begin{bmatrix} e^j \\ h^j \end{bmatrix} = \begin{bmatrix} f^i \\ 0 \end{bmatrix}, \quad (11)$$

where $$A^i = \omega^2[T^i] - [S^i] - j\omega[R^i],$$

$$[T^i]_{lk} = \int_{\Omega_i} \Phi_l^i \cdot \partial_l \Phi_k^i dV$$

$$[S^i]_{lk} = \int_{\Omega_i} (\nabla \times \Phi_l^i) \cdot (\mu_i^{-1} \nabla \times \Phi_k^i) dV$$

$$[R^i]_{lk} = \int_{\Omega_i} \Phi_l^i \cdot \sigma_i \Phi_k^i dV,$$

$$[F_{ee}^{ii}]_{lk} = -\frac{j\omega}{Z^i + Z^j} \int_{\partial\Omega_i} (\hat{n}^i \times \Phi_l^i) \cdot (\hat{n}^i \times \Phi_k^i) dS,$$

$$[F_{eh}^{ii}]_{lk} = j\omega \frac{Z^i}{Z^i + Z^j} \int_{\partial\Omega_i} \Phi_l^i \cdot (\hat{n}^i \times \Psi_k^i) dS,$$

$$[F_{ee}^{ij}]_{lk} = \frac{j\omega}{Z^i + Z^j} \int_{\partial\Omega_i} (\hat{n}^i \times \Phi_l^i) \cdot (\hat{n}^i \times \Phi_k^j) dS,$$

$$[F_{eh}^{ij}]_{lk} = j\omega \frac{Z^j}{Z^i + Z^j} \int_{\partial\Omega_{i,j}} \Phi_l^i \cdot (\hat{n}^i \times \Psi_k^j) dS,$$

$$[F_{he}^{ii}]_{lk} = j\omega \int_{\partial\Omega_i} \Psi_l^i \cdot (\hat{n}^i \times \Phi_k^i) dS,$$

$$[F_{hh}^{ii}]_{lk} = -j\omega\tau \int_{\partial\Omega_i} (\hat{n}^i \times \Psi_l^i)(\hat{n}^j \times \Psi_k^i) dS$$

$$[F_{he}^{ij}]_{lk} = j\omega \int_{\partial\Omega_{i,j}} \Psi_l^i \cdot (\hat{n}^i \times \Phi_k^j) dS,$$

$$[F_{hh}^{ij}]_{lk} = j\omega\tau \int_{\partial\Omega_{i,j}} (\hat{n}^i \times \Psi_l^i) \cdot (\hat{n}^i \times \Psi_k^j) dS, \text{ and}$$

$$f_l^i = -j\omega \int_{\Omega_i} \Phi_l^i \cdot J_{im}^i dV.$$

To facilitate the solution, (11) is written in a more compact form:

$$[M^i]u^i + \sum_j^{j \neq i}[C^{ij}]u^j = f_{im}^i, \quad (12)$$

where $$u^{i/j} = \begin{bmatrix} e^{i/j} \\ h^{i/j} \end{bmatrix},$$

$$f^i = \begin{bmatrix} f_{im}^i \\ 0 \end{bmatrix},$$

$$[M^i] = \begin{bmatrix} A^i & 0 \\ 0 & 0 \end{bmatrix}, \text{ and}$$

$$[C^{ij}] = \begin{bmatrix} F_{ee}^{ij} & F_{eh}^{ij} \\ F_{he}^{ij} & F_{hh}^{ij} \end{bmatrix}.$$

Formula (12) is a matrix governing equation of each subdomain. In order to solve the whole domain with the domain decomposition algorithm, the solution of the equations is approached by the vector obtained in the Krylov subspace that minimizes the residuals. In addition, the preconditioning technique can be used to further accelerate the convergence of the generalized minimum residual (GMRES) algorithm. In the present disclosure, the right preconditioning processing technique is used to accelerate the convergence of the algorithm. The problem of solving the original linear equation Au=b is transformed to solve Ax=AP$^{-1}$u=b, where x=P$^{-1}$u, and the matrix P is the matrix of the subdomain (A in Formula 11).

P is the matrix of each subdomain. The correct prerequisite GMRES (m) algorithm is briefly given below.

1, Start: an initial value $x_0$, a size m of the Krylov subspace, and an error threshold ε are selected.

2, Arnoldi process: $r_0$=b−A$x_0$, β=$\|r_0\|_2$, and $v_1$=$r_0$/β are calculated.

When convergence is not reached, $$w_j = AP^{-1}v_j,$$

and

```
For ii=1:m do
  For jj=1:ii do
    h_{ii,jj} =(v_{ii}, w_{jj})
    w_{jj} = w_{jj} - h_{ii,jj}v_{ii}
  end For
  h_{ii+1,ii} =|| w_{jj} ||_2
  v_{ii} = w_{ii} / h_{ii+1,ii}
end For
end while,
``` and the Heisenberg matrix $\tilde{H}_m$ [−$_{ii,jj}$] and the basis vector $V_m$=[$v_1$, . . . , $v_m$] are obtained.

3, $y_m$ is solved by minimizing $$\left\|\beta e_1 - \tilde{H}_m y_m\right\|_2$$

and $e_1$=[1, 0, . . . , 0]$^T$.

4, An approximate solution: $x_m$=$x_0$+M$^{-1}$V$_m$y$_m$ is obtained.

Restart: If there is no convergence, $x_0$=$x_m$ is set and the method goes to step 2, where the convergence criterion is $\|r\|_2/\|b\|_2$·ε.

S46, The electric field value of any point in the tetrahedron to which the edge belongs is calculated according to the electric field expansion coefficient of the edge and the electric field vector basis function corresponding to the edge.

After the electric field expansion coefficient of the edge is calculated, according to the tetrahedron to which the position to be solved belongs, the electric field expansion coefficient of each edge in the tetrahedron and the electric field vector basis function of each edge are substituted into Formula (9) to obtain the electric field value at the position to be solved.

S47, The magnetic field value at the interface of the subdomain to which the edge belongs is calculated according to the magnetic field expansion coefficient of the edge and the magnetic field vector basis function corresponding to the edge.

One or two specific calculation examples are provided below to illustrate the effect of the method of the present disclosure.

Calculation Example 1

Figure 2:
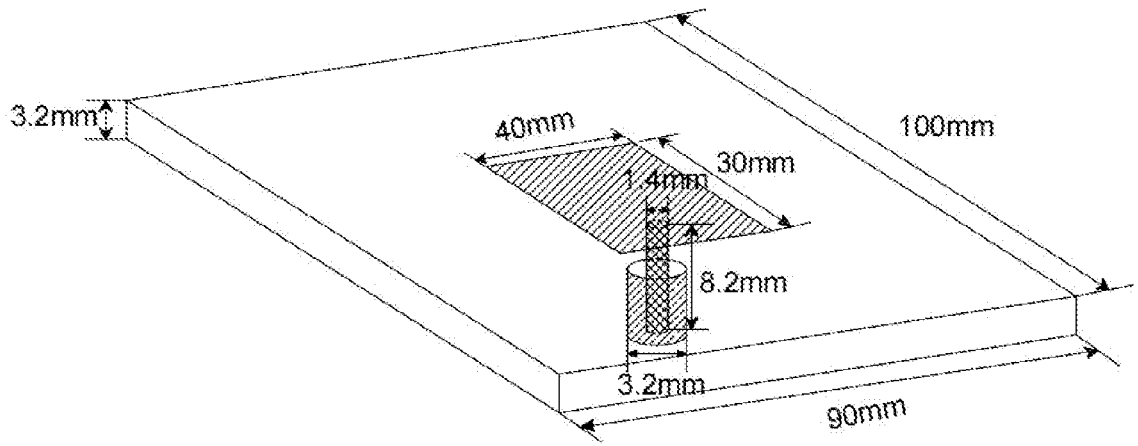
FIG. 2 is a structural diagram of a microstrip patch antenna provided by Calculation Example 1 of the present disclosure.

This calculation example is a typical microstrip patch antenna. Referring to FIG. 2, a dielectric substrate has a size of 90 mm×100 mm, a thickness of 3.2 mm, and a permittivity of 1.86. The metal patch has a size of 40 mm×30 mm. The microstrip patch antenna is fed by a coaxial line. The coaxial line has an inner radius of 1.4 mm, an outer radius of 3.2 mm, and a length of 8.2 mm.

Figure 3:
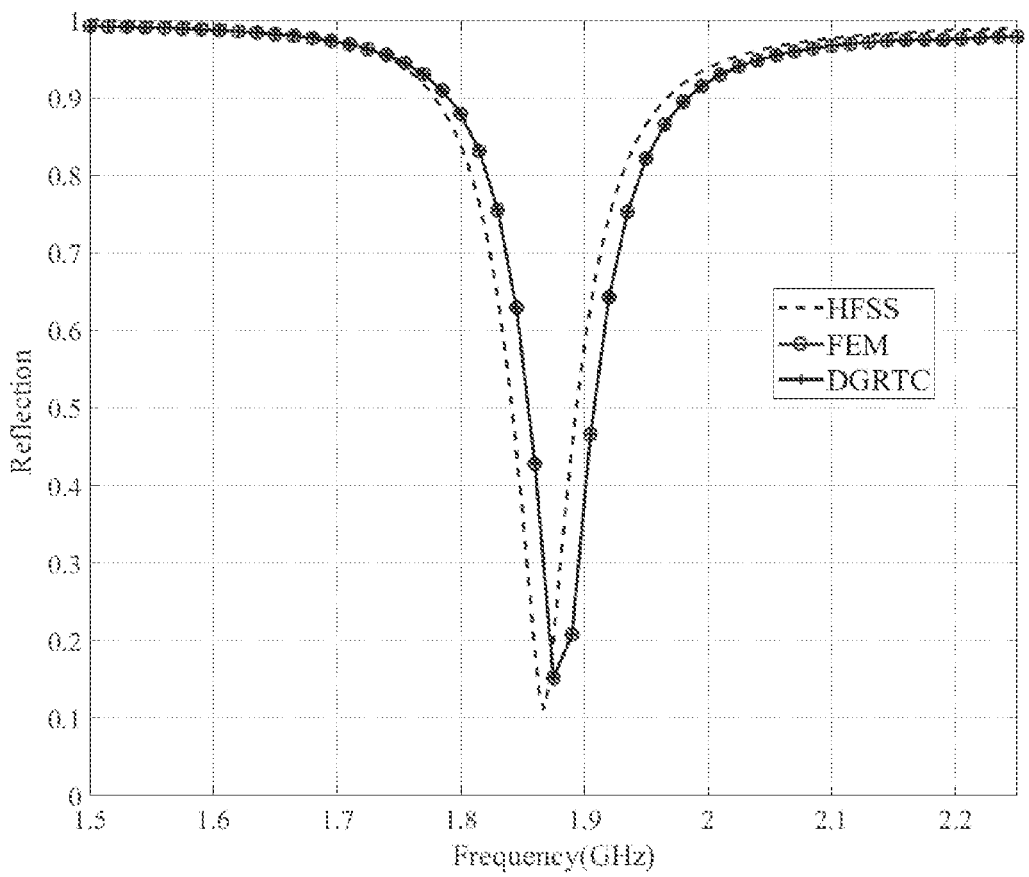
FIG. 3 is a rule diagram of variations of a reflection coefficient of the microstrip patch antenna with frequencies provided by Calculation Example 1 of the present disclosure.

The DGRTC algorithm, the FEM algorithm, and the commercial softwareHFSS of the present disclosure are used to simulate the above microstrip patch antenna. FIG. 3 shows a rule of variations of a reflection coefficient of the microstrip patch antenna with frequencies. It can be seen from FIG. 3 that the DGRTC method is in good agreement with the FEM, and there are some errors with the results of commercial software. However, within the acceptable range of engineering, this calculation example can verify the correctness of the method of the present disclosure.

Calculation Example 2

Figure 4:
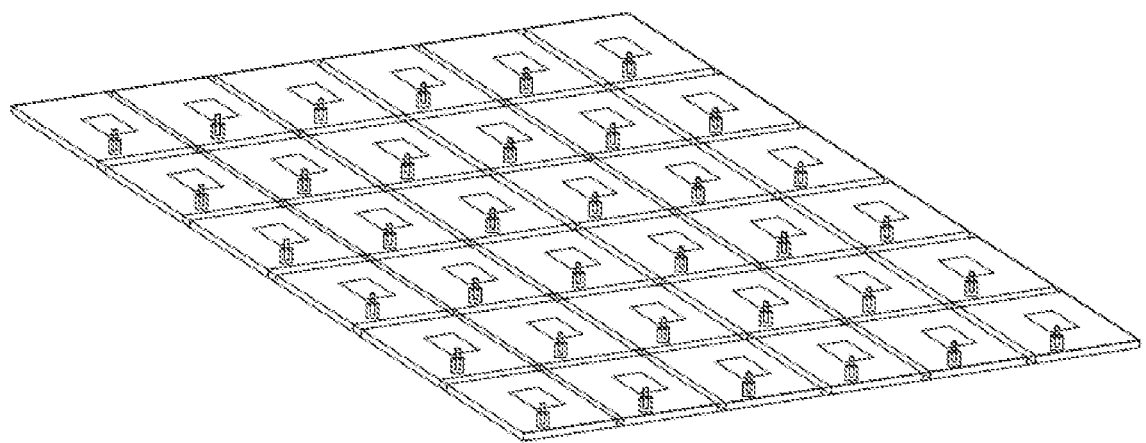
FIG. 4 is a diagram of a microstrip patch antenna array provided by Calculation Example 2 of the present disclosure.

Calculation Example 2 is a 6×6 microstrip patch antenna array. Referring to FIG. 4, the parameters of each element are the same as those of Calculation Example 1.

Figure 5:
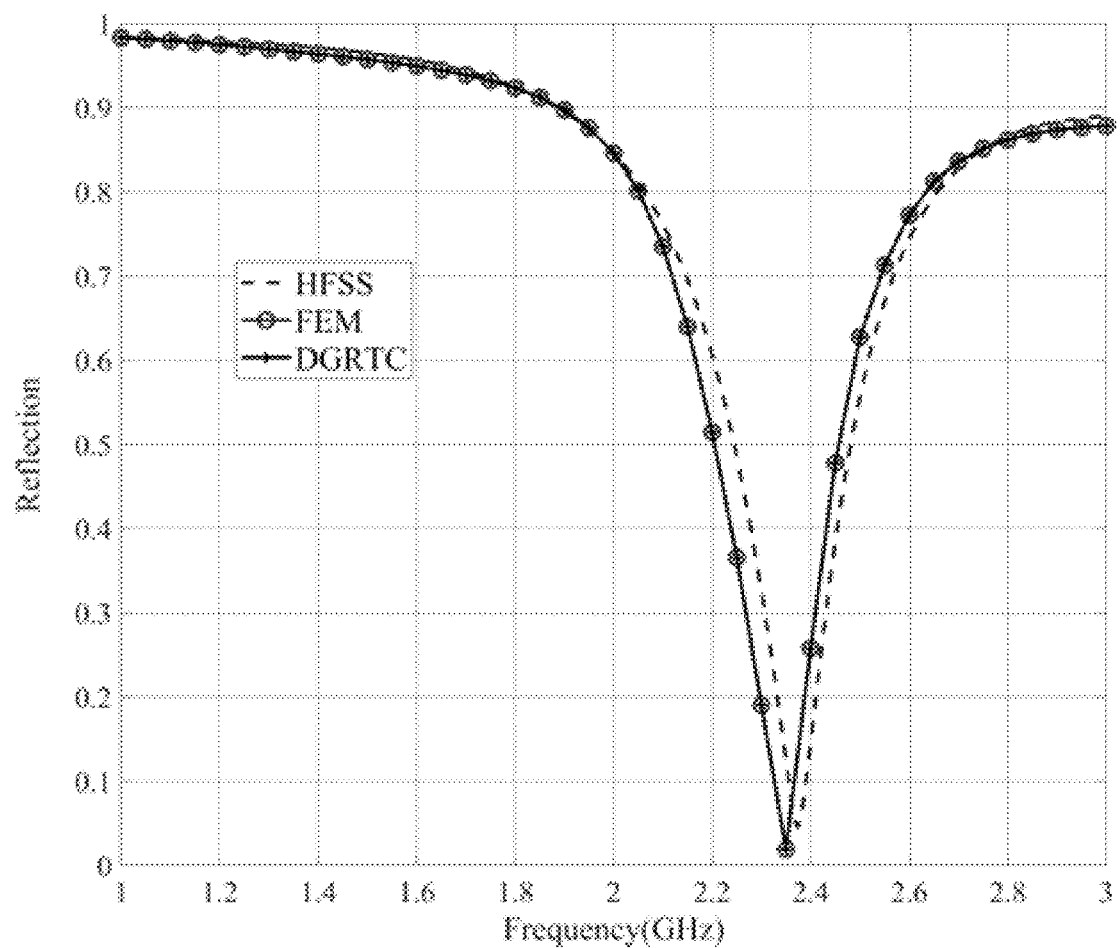
FIG. 5 is a rule diagram of variations of a reflection coefficient of the microstrip patch antenna array with frequencies provided by Calculation Example 2 of the present disclosure.

FIG. 5 shows a rule of variations of the reflection coefficient of the microstrip patch antenna with frequencies. It can be seen from FIG. 5 that the DGRTC method is in good agreement with the FEM and the HFSS method.

Figure 6:
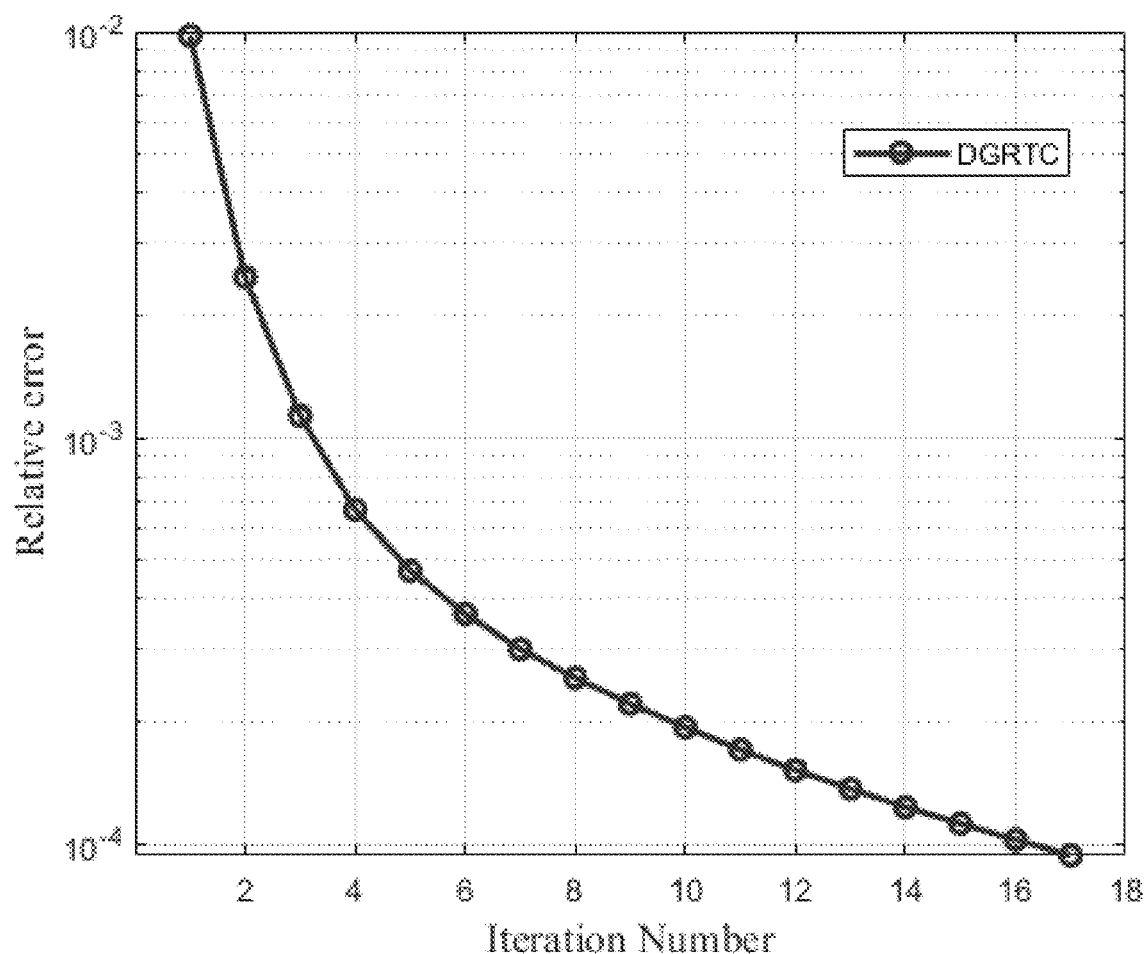
FIG. 6 is a schematic diagram of the convergence of a domain decomposition algorithm provided by the present disclosure.
Figure 7:
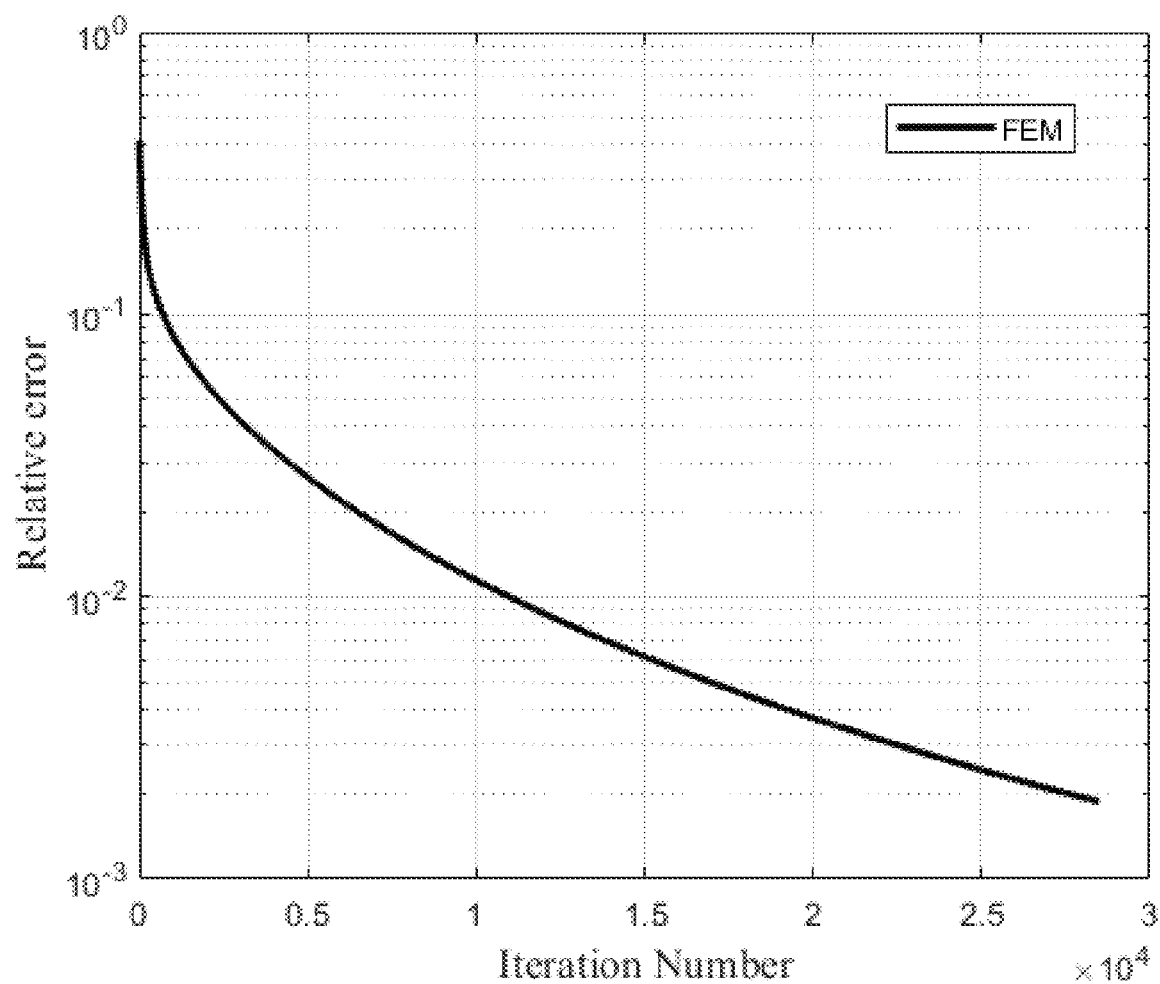
FIG. 7 is a schematic diagram of the convergence of the FEM method provided by the present disclosure.

Meanwhile, FIG. 6 and FIG. 7 compares the convergence of the DGRTC method and the FEM. The abscissa is the iteration number, and the ordinate is the relative error. It can be seen that the DGRTC method of the present disclosure can reduce the error to $10^{-4}$ magnitude through 17 iterations, while the FEM requires $2.8 \times 10^4$ iterations and fails to converge to $10^{-4}$ magnitude, which shows the advantages of the present disclosure.

The traditional FEM needs to solve a large sparse matrix when solving a problem with a large unknown quantity, which is easy to cause the matrix ill-condition and difficult to converge, and the computational efficiency is greatly reduced. The sparse matrix size of this algorithm only depends on the size of the subdomain, and the matrix is processed by the preconditioning technique, so the efficiency of an iterative solution is significantly improved.

Although the traditional DG method can be arbitrarily modeled and realize the domain decomposition at the unit level, it needs to solve the electric field and the magnetic field simultaneously in the whole domain because it solves the Maxwell equation. It consumes a lot of memory when dealing with large-scale integrated circuit problems, which is a heavy burden. In order to solve the electric field wave equation, this algorithm only needs to solve the magnetic field at the interface of domain decomposition and the electric field in the whole domain, which greatly reduces the memory and the unknown quantity compared with the traditional DG method.

Embodiment 2

Figure 8:
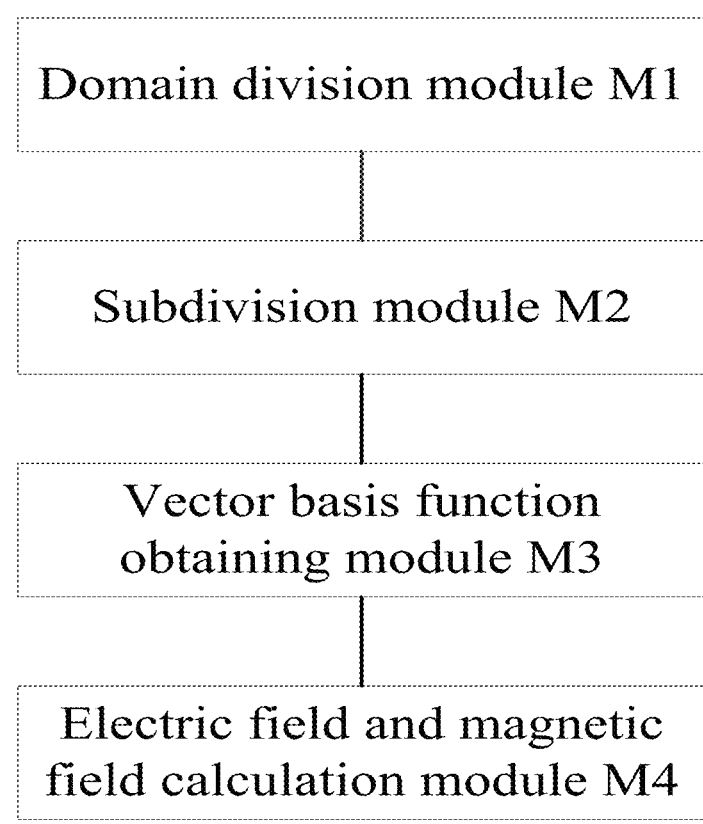
FIG. 8 is a structural diagram of a domain decomposition system for electromagnetic simulation provided by Embodiment 2 of the present disclosure.

The present embodiment provides a domain decomposition system for electromagnetic simulation, referring to FIG. 8, including: a domain division module M1, a subdivision module M2, a vector basis function obtaining module M3, and an electric field and magnetic field calculation module M4.

The domain division module M1 is configured to divide an antenna structure model into multiple subdomains. The antenna structure model is an antenna structure model obtained by modeling to-be-simulated array antennas with modeling software. Each of the subdomains corresponds to a structure in one of the to-be-simulated array antennas.

The subdivision module M2 is configured to subdivide each of the subdomains by a tetrahedral network to obtain multiple tetrahedrons. The size of the tetrahedral network is determined by the degree of fine demand of the corresponding subdomain, and the degree of fine demand of the subdomain is determined by the degree of fine subdivision demand of a corresponding structure.

The vector basis function obtaining module M3 is configured to obtain a vector basis function of each edge of each of the tetrahedrons according to vertex positions, lengths of the edges, and a volume parameter of the tetrahedron. The vector basis function includes an electric field vector basis function and a magnetic field vector basis function.

The electric field and magnetic field calculation module M4 is configured to calculate an electric field value and a magnetic field value of any point in a tetrahedron to which each of the edges belongs using a vector basis function corresponding to the edge and a double curl electric field wave equation of a subdomain to which the edge belongs.

Optionally, the electric field and magnetic field calculation module M4 specifically includes: a first test sub-module M41, a first equation obtaining sub-module M42, a boundary condition equation obtaining sub-module M43, a second test sub-module M44, an expansion coefficient calculation sub-module M45, an electric field value calculation sub-module M46, and a magnetic field value calculation sub-module M47.

The first test sub-module M41 is configured to perform a DG test on the double curl electric field wave equation of the subdomain to which the edge belongs to obtain a test equation.

The first equation obtaining sub-module M42 is configured to substitute a numerical flux into the test equation to obtain a first equation.

The boundary condition equation obtaining sub-module M43 is configured to define a boundary condition equation satisfying the tangential continuity of an electric field and a magnetic field of the subdomain. The tangential continuity means that components of the electric field and the magnetic field in a tangential direction are continuous at an interface of every two adjacent subdomains.

The second test sub-module M44 is configured to perform a DG test on the boundary condition equation to obtain a second equation.

The expansion coefficient calculation sub-module M45 is configured to calculate an electric field expansion coefficient of the edge and a magnetic field expansion coefficient of the edge according to the first equation and the second equation.

The electric field value calculation sub-module M46 is configured to calculate the electric field value of any point in the tetrahedron to which the edge belongs according to the electric field expansion coefficient of the edge and the electric field vector basis function corresponding to the edge.

The magnetic field value calculation sub-module M47 is configured to calculate the magnetic field value of any point in the tetrahedron to which the edge belongs according to the magnetic field expansion coefficient of the edge and the magnetic field vector basis function corresponding to the edge.

Embodiments of the present specification are described in a progressive manner, each embodiment focuses on the difference from other embodiments, and the same and similar parts between the embodiments may refer to each other. Since the system disclosed in an embodiment corresponds to the method disclosed in another embodiment, the description is relatively simple, and reference can be made to the method description.

Specific examples are used herein to explain the principles and embodiments of the present disclosure. The foregoing description of the embodiments is merely intended to help understand the method of the present disclosure and its core ideas; besides, various modifications may be made by those of ordinary skill in the art to specific embodiments and the scope of application in accordance with the ideas of the present disclosure. In conclusion, the content of the present specification shall not be construed as limitations to the present disclosure.

What is claimed is:

1. A method for electromagnetic simulation, comprising:
   dividing an antenna structure model into multiple subdomains, wherein the antenna structure model is obtained by modeling array antennas to be simulated via a modeling software, and each of the subdomains corresponds to a structure in one of the array antennas;
   subdividing each of the subdomains by a tetrahedral network to obtain multiple tetrahedrons, wherein the size of the tetrahedral network is determined by a degree of fine demand of the corresponding subdomain, and the degree of fine demand of the subdomain is determined by a degree of fine subdivision demand of a corresponding structure;
   obtaining a vector basis function of each edge of each of the tetrahedrons according to vertex positions and lengths of the edges of the tetrahedron, wherein the vector basis function comprises an electric field vector basis function and a magnetic field vector basis function; and
   calculating an electric field value and a magnetic field value of any point in a tetrahedron to which each of the edges belongs using a vector basis function corresponding to the edge and a double curl electric field wave equation of a subdomain to which the edge belongs.

2. The method according to claim 1, wherein a process of calculating an electric field value and a magnetic field value of any point in a tetrahedron to which each of the edges belongs using a vector basis function corresponding to the edge and a double curl electric field wave equation of a subdomain to which the edge belongs specifically comprises:
   performing a discontinuous Galerkin (DG) test on the double curl electric field wave equation of the subdomain to which the edge belongs to obtain a test equation;
   substituting a numerical flux into the test equation to obtain a first equation;
   defining a boundary condition equation satisfying the tangential continuity of an electric field and a magnetic field of the subdomain, wherein the tangential continuity means that components of the electric field and the magnetic field in a tangential direction are continuous at an interface of every two adjacent subdomains;
   performing a DG test on the boundary condition equation to obtain a second equation;
   calculating an electric field expansion coefficient of the edge and a magnetic field expansion coefficient of the edge according to the first equation and the second equation;
   calculating the electric field value of any point in the tetrahedron to which the edge belongs according to the electric field expansion coefficient of the edge and the electric field vector basis function corresponding to the edge; and
   calculating the magnetic field value at the interface of the subdomain to which the edge belongs according to the magnetic field expansion coefficient of the edge and the magnetic field vector basis function corresponding to the edge.

3. The method according to claim 2, wherein the test equation is:

$$\int_{\Omega_i} \left[ (\nabla \times \Phi^i) \cdot (\mu_i^{-1} \nabla \times E^i) - \omega^2 \Phi^i \cdot \partial_i E^i + j\omega \Phi^i \cdot \sigma_i E^i \right] dV +$$

$$j\omega \int_{\Omega_i} \Phi^i \cdot (\hat{n}^i \times \bar{H}^i) dS = -j\omega \int_{\Omega_i} \Phi^i \cdot J_{im}^i dV,$$

wherein i represents an i-th subdomain, and $\varepsilon_i$, $\mu_i$, and $\sigma_i$ are a permittivity of a subdomain $\Omega_i$, a magnetic permeability of the subdomain $\Omega_i$, and an electric conductivity of the subdomain $\Omega_i$ respectively; $\Phi$ is a testing function, and the testing function is equal to an electric field vector basis function; E is the electric field; H is the magnetic field; $\hat{n}$ represents a normal unit vector; j is an imaginary part; $\omega$ is an angular frequency; $J_{im}^i$ is an impressed volume electric current source in the subdomain $\Omega_i$; $\nabla \times$ represents a curl symbol; V represents a volume of the subdomain; and S represents a surface area of the subdomain.

4. The method according to claim 3, wherein a formula of the numerical flux is:

$$\hat{n}^i \times \bar{H}^i = \hat{n}^i \times \left[ \frac{(Z^i H^i + Z^j H^j) + \hat{n}^i \times (E^i - E^j)}{Z^i + Z^j} \right],$$

wherein $Z^i$ represents the wave impedance of the subdomain $\Omega_i$; $Z^j$ represents the wave impedance of a neighboring subdomain $\Omega_j$; the neighboring subdomain is a neighboring subdomain of the subdomain; $H^i$ represents a magnetic field at an interface of the subdomain $\Omega_i$, and $H^j$ represents a magnetic field at an interface of the neighboring subdomain $\Omega_j$; and $E^i$ represents an electric field at the interface of the subdomain, and $E^j$ represents an electric field at the interface of the neighboring subdomain.

5. The method according to claim 4, wherein the boundary condition equation is:

$$\hat{n}^i \times E^i - \tau \hat{n}^i \times H^i \times \hat{n}^i = -\hat{n}^j \times E^j - \tau \hat{n}^j \times H^j \times \hat{n}^j,$$

wherein $\tau$ is a scale factor.

6. The method according to claim 5, wherein the second equation is:

$$j\omega \int_{\partial\Omega_i} \Psi^i \cdot \left[\hat{n}^i \times (E^i - E^j) - \tau \hat{n}^i \times (H^i - H^j) \times \hat{n}^i\right] dS = 0,$$

wherein $\Psi^i$ is a magnetic field vector basis function of the subdomain $\Omega_i$.

7. A domain decomposition system for electromagnetic simulation, comprising:
- a domain division module configured to divide an antenna structure model into multiple subdomains, wherein the antenna structure model is an antenna structure model obtained by modeling to-be-simulated array antennas with modeling software; and each of the subdomains corresponds to a structure in one of the to-be-simulated array antennas;
- a subdivision module configured to subdivide each of the subdomains by a tetrahedral network to obtain multiple tetrahedrons, wherein the size of the tetrahedral network is determined by a degree of fine demand of the corresponding subdomain, and the degree of fine demand of the subdomain is determined by a degree of fine subdivision demand of a corresponding structure;
- a vector basis function obtaining module configured to obtain a vector basis function of each edge of each of the tetrahedrons according to vertex positions and lengths of the edges of the tetrahedron, wherein the vector basis function comprises an electric field vector basis function and a magnetic field vector basis function; and
- an electric field and magnetic field calculation module configured to calculate an electric field value and a magnetic field value of any point in a tetrahedron to which each of the edges belongs using a vector basis function corresponding to the edge and a double curl electric field wave equation of a subdomain to which the edge belongs.

8. The system according to claim 7, wherein the electric field and magnetic field calculation module specifically comprises:
- a first test sub-module configured to perform a DG test on the double curl electric field wave equation of the subdomain to which the edge belongs to obtain a test equation;
- a first equation obtaining sub-module configured to substitute a numerical flux into the test equation to obtain a first equation;
- a boundary condition equation obtaining sub-module configured to define a boundary condition equation satisfying tangential continuity of an electric field and a magnetic field of the subdomain, wherein the tangential continuity means that components of the electric field and the magnetic field in a tangential direction are continuous at an interface of every two adjacent subdomains;
- a second test sub-module configured to perform a DG test on the boundary condition equation to obtain a second equation;
- an expansion coefficient calculation sub-module configured to calculate an electric field expansion coefficient of the edge and a magnetic field expansion coefficient of the edge according to the first equation and the second equation;
- an electric field value calculation sub-module configured to calculate the electric field value of any point in the tetrahedron to which the edge belongs according to the electric field expansion coefficient of the edge and the electric field vector basis function corresponding to the edge; and
- a magnetic field value calculation sub-module configured to calculate the magnetic field value of any point in the tetrahedron to which the edge belongs according to the magnetic field expansion coefficient of the edge and the magnetic field vector basis function corresponding to the edge.

* * * * *